United States Patent [19]

Vroonland et al.

[11] Patent Number: 4,537,233

[45] Date of Patent: Aug. 27, 1985

[54] SPRING BALANCE ASSEMBLY

[75] Inventors: Evart. J. Vroonland; William M. Curtis, both of Richardson, Tex.

[73] Assignee: Continental Emsco Company, Garland, Tex.

[21] Appl. No.: 506,276

[22] Filed: Jun. 21, 1983

[51] Int. Cl.³ .............................................. B65B 3/04
[52] U.S. Cl. ..................................... 141/387; 16/299; 16/308; 16/322; 248/292.1; 248/575; 267/155; 285/152
[58] Field of Search ...................... 141/387, 388, 279; 16/308, 299, 300, 301, 319, 322, DIG. 36; 248/292.1, 122.1, 575, 566, 543; 267/155, 58; 285/152, 276

[56] References Cited

U.S. PATENT DOCUMENTS

| | | | |
|---|---|---|---|
| 2,737,362 | 3/1956 | Krone et al. | 267/155 |
| 2,739,779 | 3/1956 | Krone et al. | 267/155 |
| 2,749,570 | 6/1956 | Alder | 267/155 |
| 3,083,400 | 4/1963 | Anderson | 267/155 |

Primary Examiner—Houston S. Bell, Jr.
Attorney, Agent, or Firm—Arnold, White & Durkee

[57] ABSTRACT

This invention provides for a loading arm for use with material handling systems and includes a support structure and an arm pivotally attached to the support structure for swivel movement in both the horizontal and vertical plane relative to the support structure. There is also provided a balancing system for balancing the swivel arm relative to the support structure which includes a coil spring having a pre-determined length, a housing enclosing the coil spring, a first end of the housing having a structure for engaging a first coil end of the coil spring and an adjustment device for positioning that first coil end in infinitely small increments along a generally circular path which is radially disposed from the center line of the spring, a second end of the housing having another groove for engaging a second coil end of the spring, a linkage arm attached at one end to the swivel arm and at its other end to the second end such that movement of the swivel arm in the vertical plane will cause the second coil end to move along a generally circular path radially disposed from the centerline of the spring. The system also includes a mounting structure for attaching the balancing system to the loading arm and the horizontal swivel.

9 Claims, 6 Drawing Figures

SPRING BALANCE ASSEMBLY

TECHNICAL FIELD

The present invention relates to a spring support means for balancing swivelable arms and more particularly to a spring support means for use on devices such as loading arms for the transfer of both wet or dry materials to tank cars or trucks where such devices have an adjustment capability to allow for handling a variety of loads.

BACKGROUND ART

The conventional spring balance assembly used industry wide is similar to that shown in U.S. Pat. No. 3,244,440 issued to Albert A. Ashton et al on Apr. 5, 1966. This design for a spring balance counterweight system for balancing the loading arm employs a number of conventional elements, as shown in FIG. 1 of Ashton et al, including a means for mounting the spring support system to the vertical riser 10, an attachment means for attaching the spring support to the horizonal swivel 12 such as bracket 17 and an attachment arm 33 for connecting the spring support system to the loading arm. Also there is typically some form of housing, generally shown as bracket 17, which includes some means for supporting a shaft 18 or similar element which can be secured in place relative to bracket 17 by a variety of means such as cotter pins 19. A pair of spring support elements 21 and 22 are supported by shaft 18 and they are adapted to house and carry coil spring 24. Spring 24 has a pair of oppositely disposed coil end elements 25 and 27 which are designed to extend into slots 26 and 28 of spring supports 22 and 21, respectively. Spring support 22 furthermore has a rotatable arm 23 which extends outwardly and is attached to arm 33 which in turn is connected to the loading arm such that any movement of the loading arm is transmitted by arm 33 to rotatable arm 23 which in turn is connected to and moves against the resistance of spring 24. Since the spring support system may require initial adjustment and periodical readjustment in order to properly support the loading arm in the desired position, any spring assembly including the above-described Ashton system requires a means for adjustment that is capable of tensioning or relaxing the coil spring in order to estblish the desired relationship to the loading arm. To accomplish this in Ashton spring support element 23 is designed to be movable in either direction relative to the spring such that this movement will tighten or relax the spring tension on spring 24. A means is provided for locking spring support 22 such as the teeth that cooperate with set screw 29 to lock spring support 21 in a given position. A more complete description of this type of locking device is shown and described in FIGS. 2 and 7 of U.S. Pat. No. 3,038,714 issued to R. M. Klaus et al. entitled Torsional Spring Balance Unit. The toothed spring regulator 18 of Klaus forms a part of spring support element 9 and is rotatably affixed relative to shaft 17 in bracket 12. Regulator 18 is also fixed to hub 21 that has a slot 22 to receive a lock coil end 29 of tension spring 28. The regulator therefore can be used to increase or decrease the tension on spring 28 by counter-clockwise or clockwise movement, respectively and, once positioned to the desired tension, is locked in place by keeper 31.

This design allows the user to tighten or loosen coil spring 24 to the degree necessary to adequately support and position loading arm. It also allows the user to periodically readjust as required to account for spring fatigue or the like or the addition of auxiliary parts that add weight to the loading arm for alternative end uses. The Ashton design, while typical in the industry, has a number of problems such as the need for periodic retensioning and the difficulty in retensioning the spring support assembly, the difficulty in changing spring 24 to change the available weight support range, and the exposure of the several system elements to the environment. The consequence of these problems is that this system is not always reliable. For example, in order to adjust and/or readjust the spring assembly system, the operator must support the loading arm in order to relieve coil spring 24 of the load, make an adjustment to spring support 21 as best as can be guessed, and then release the loading arm hoping that the new spring tension is adequate to support the loading arm. This maneuver tends to frustrate the worker when there is frequent retensioning and inevitably the operator foregoes the retensioning procedure. The result is that the spring rapidly fatigues or loses its resiliency, the available counterbalancing spring tension diminishs and the loading arm eventually falls to or is left to rest on the ground. Furthermore the above-described spring balance system and the system typically used in the industry is unclosed and hence is unprotected and subject to further deterioration from exposure to the environment.

Accordingly it is an object of the present invention to provide a spring support system that is capable of providing high reliability and a greater useful life while still being relatively inexpensive.

Furthermore it is an object of the present invention to provide a system that is simple and convenient and that can be quickly adjusted to account for a variety of service conditions including the addition of parts to the loading arms in order that the user can readily accommodate a variety of end uses without the need for a difficult or involved method of adjustment.

Finally it is an object of the present invention to provide a system that is capable of handling a wide range of loading requirements with an infinitely variable adjustment means and by employing a series of different size springs having different load ranges which can be easily replaced to increase or diminish the available spring tension.

DISCLOSURE OF THE INVENTION

The invention provides for a loading arm comprising a support means and an arm pivotally attached to the support means for swivel movement in both the horizontal and vertical plane relative to the support means. The invention also includes a means for balancing the swivel arm relative to the support means and the balancing system includes a coil spring having a pre-determined length, a housing enclosing the coil spring, a first end of the housing having a means for engaging a first coil end of the coil spring and a means for positioning that first coil end in infinitely small increments along a generally circular path which is radially disposed from the center line of the spring, a second end of the housing having a means for engaging a second coil end of the spring, and a linkage arm attached at one end to the swivel arm and at its other end to the second end such that movement of the swivel arm in the vertical plane will cause the second coil end to move along a generally circular path radially disposed from the centerline of the spring. The system also provides a means for attaching the balancing means to the loading arm and the horizontal swivel means.

BRIEF DESCRIPTION OF THE DRAWINGS

Further object and advantages of the invention will become apparent from the following description and claims, and from the accompanying drawings, wherein:

DETAILED DESCRIPTION OF THE INVENTION

Figures 1, 2:
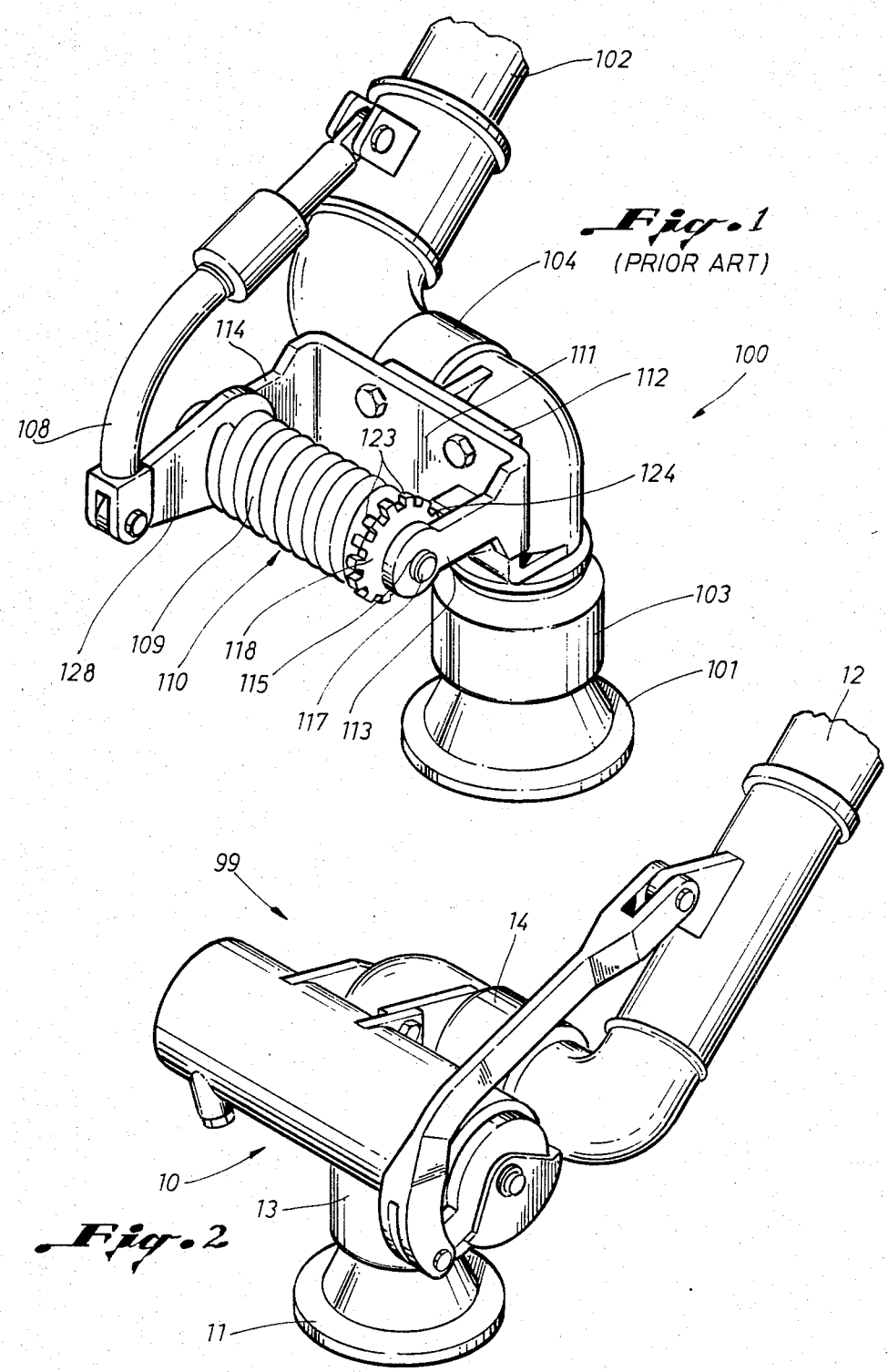
FIG. 1 is a perspective view of a spring support system that is typical of loading arms used in the petroleum and chemical industry.
FIG. 2 is a perspective view of one embodiment of the present invention in which the spring support system is employed with the riser stand of a typical loading arm and where the spring support system is rigidly affixed to the riser and loading arm by means of weldments and brackets.

Referring now to the drawings in detail, wherein like numerals indicate like elements throughout the several views, the present invention is shown in one embodiment which is a preferred embodiment for use with material handling loading arms such as are used for the transfer of petroleum or chemical products, although there are any number of other potential embodiments. In FIG. 1 there is shown a perspective view of a loading arm 100 that is typical of loading arms currently in use particularly in the petroleum and chemical industry. The loading arm 100 includes a riser 101, although a downcomer could easily be substituted therefore, and an arm 102 that is attached to swivel 104. Loading arm 110 also inludes a spring support system 110 that includes a housing 111 having an attachment bracket 112 for connecting system 110 to the riser. Housing 111 further includes brackets 113 and 114 each having a bore 115 and 116, respectively, for supporting shaft 117. Shaft 117 supports two stub shafts 118 and 119, not shown, that are rotatable relative to shaft 117. Stub shaft 118 includes a support 120, not shown, for coil spring 109 and a slot 121, not shown for coil end 122, not shown, of spring 109, and a series of toothed elements 123 designed to cooperate with a keeper element 124 such that when shaft 118 is turned it increases or decreases the tension in spring 109. Similarly stub shaft 119 includes a support 125 for coil spring 109 and a slot 126, not shown, for coil end 127, not shown. Shaft 119 also includes an extension 128 that is adapted to connect with lever arm 108 that in turn is connected with arm 102.

FIG. 2, on the other hand, is a perspective view of a similar loading arm 99 to that shown in FIG. 1 but having a distinctively different spring support system 10. Loading arm 99 includes the a riser 11, arm 12 connected with horizontal swivel 13 and vertical swivel 14. Spring support system 10 is shown in greater detail in FIGS. 3 and 4.

Figure 3:
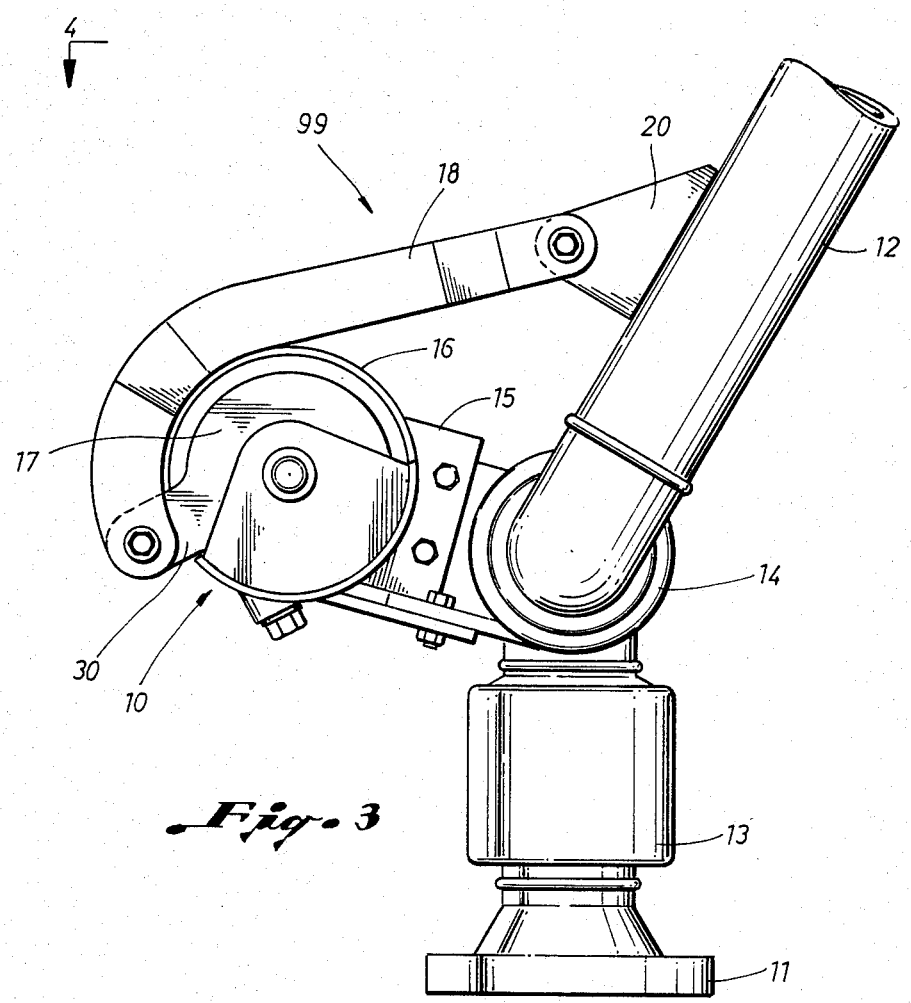
FIG. 3 is an side elevational view of the spring support system of the present invention shown in FIG. 2.

FIG. 3 shows a partial side elevational view of loading arm 99 with only a portion of riser 11 and 12 visible. Also shown is the spring support system 10 and the swivels, the horizontal swivel 13 and the vertical swivel 14. This particular embodiment is mounted on the riser but it can also be readily converted to mount on a downcomer for similar purposes and only the details of the design would need to be modified.

Figure 4:
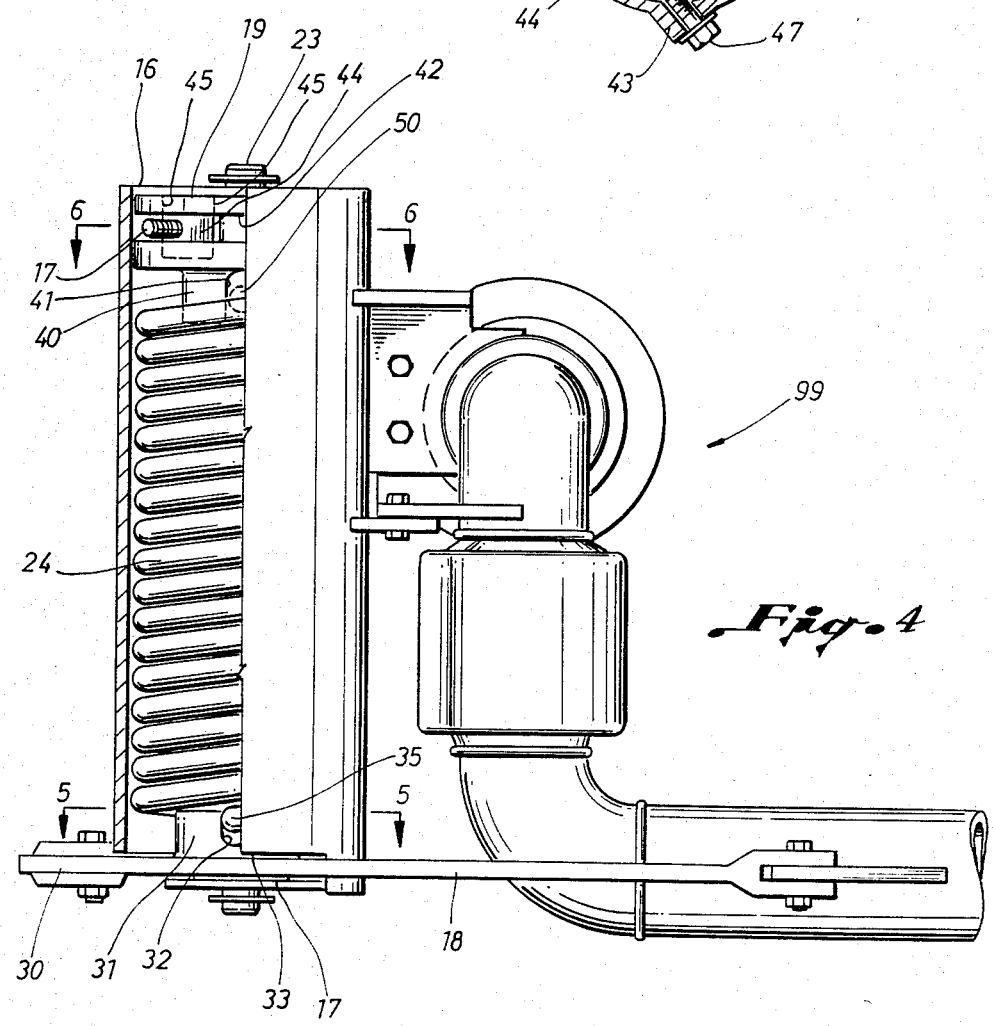
FIG. 4 is a top plan view of the spring support system of FIG. 3 partially broken away to show the details of the housing for the spring support assembly and the attachment means connected it to the riser and the loading arm.

Spring support assembly 10 includes, for purpose of this description all elements apart from riser 11, arm 12 and swivels 13 and 14. As shown in FIG. 3 spring support system 10 includes a securing means 15 adapted to support the spring support assembly either directly on the riser or on the housing for the horizontal swivel 14. The spring support also includes housing 16 which is adapted to have a coil spring 22 therein, a spring arm cap 17 which is adapted to close one end of housing 16 and which has an extension element 30 to attach to a linkage arm 18 which in turn is adapted to connect and be affixed to attachment means 20 for attaching spring assembly 10 to loading arm 12. FIG. 4, which is the plan view of FIG. 3 as indicated by arrows 4—4, shows housing 16 partially broken away to expose the internal dimensions and scale of housing 16 in relation to the several parts contained therein. In particular there is shown the two end caps for closing housing 16, i.e., spring arm cap 17 having extension element 30 which is adapted for connecting to linkage arm 18 and housing cap 19. Each end cap 17 and 19 includes an inwardly directed coil spring retention element 31 and 40, respectively, which are adapted to engage with coil spring ends 35 and 50, respectively, by positioning into grooves 32 and 41. A shaft 23 extends through housing 16 and through bores 33 and 45 of end caps 17 and 19, respectively. Housing cap 19 also includes a groove 42 which is provided to allow the end of adjusting screw 47 to extend past barrel nut 44 and track therethrough without obstruction. Barrel nut 44 is designed to fit into bore 45 which is cut into end cap 19 such that it extends beyond screw groove 42. Barrel nut 44 in turn has a threaded bore 46 cut therethrough for accepting threaded adjustment bolt 47. In operation, as bolt 47 is turned in one direction or another it will draw with it the captive barrel nut and with it the captive end cap 19 which holds coil spring end 50, and thereby bolt 47 can increase and decrease the tension on coil spring 24. In order to insure a reasonable smooth operation for adjustment bolt 47 a suitable flat surface element 43 (see FIG. 6) positioned perpendicular to the direction of travel is provided for support to adjusting bolt 47. In addition a stop 49 is provided to define the maximum tension allowable on coil spring 24.

Figure 5:
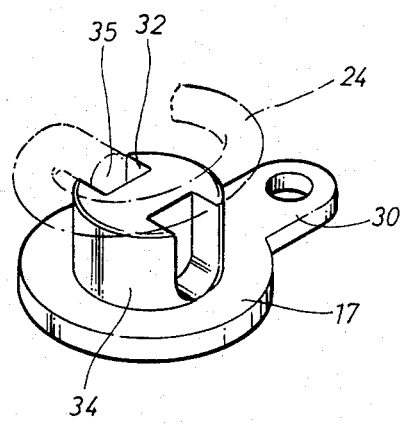
FIG. 5 is a cross-sectional view taken along lines 5—5 through the housing of the spring support assembly in FIG. 4 disclosing the adjustment means employed therefore.
Figure 6:
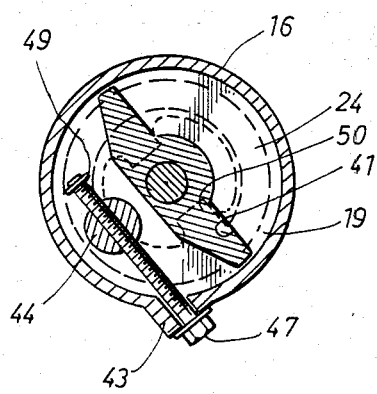
FIG. 6 is a cross-sectional view taken along lines 665 through the housing element of the spring support assembly showing the end cap closing the housing element at the end opposite to the end shown in FIG. 5.

FIGS. 5 and 6 show further details of the spring arm cap 17 and housing cap 19, respectively. In particular FIG. 5 shows an assembly view of spring arm cap 17 with coil spring end 35 positioned in groove 32 of cap 17 and also shows a bronze brushing 34 which is added to provide a support means for the rotation of linkage arm 18 relative to spring arm 17 and to minimize the friction effects of such rotation. FIG. 6 shows an assembly view of housing cap 19 including the threaded adjustment bolt 47, barrel nut 44 having flat element 43 and stop 49, and showing coil spring end 50 positioned in groove 41 of cap 19.

Having described the assembly of spring support system 10, it should clear that adjustment of the spring tension of coil spring 24 to support of loading arm 12 is relatively simple and that it can be infinitely varied through the range of tension available from a particular coil spring 22. Loading arm 12 can therefore be properly supported in a variety of services and with a variety of add-on elements which can increase or decrease weight, with a simple adjustment of adjustment bolt 47. In addition spring support assembly 10 is designed to enable an operator to easily and quickly change the size of spring to thereby change the range of tension available from coil spring 22. The system design includes a number of custom springs that all have the same length and same diameter in order to fit into the same housing.

In one preferred embodiment of the invention housing 16 is designed from 6 inch diameter schedule 40 pipe fabricated to 19 inches/pounds. Use of this particular material is preferred simply because it is easily obtained and in view of the fact that such pipe is already used in the manufacture of loading arms. The schedule 40 pipe is provided with a cut-out sufficient to accommodate spring arm cap 17 and its angle of rotation as shown in FIGS. 3 and 4 and is further provided with appropriate mounting bores and a bore for threaded adjusting bolt 47. The two end caps, spring arm cap 17 and housing cap 19 are typically fabricated from steel castings and machined as required. Spring arm cap 17 is cast to include groove 32 for supporting coil end 35 of coil spring 22 and the only required machining is for bore 36 which is required for bushing 34. Housing cap 19 can be cast to include groove 41 for coil end 50, the central bore for support of bolt 23 and threaded bolt groove 42 and therefore the only machining required to complete housing cap 19 is the eccentrically located bore 45 for supporting barrel nut 44. Having provided housing 16 with a particular size and having appropriately sized end caps, one can now design and specify a range of coil springs 22 that can be provided to accommodate a much larger range of tension support. Typical examples for coil spring 22 would be custom made coil springs having the appropriately positioned and cut end coils turned such that the coil ends are positioned for engaging grooves 32 and 41 of end caps 17 and 19, respectively. Typical capacities for coil spring 22 fabricated from 5168 spring steel of varying wire diameter would be as follows:

| Wire Diameter | (Nominal) Load Capacity |
|---|---|
| 1 inch (2.54 cm) | 1200–1600 ft-lbs (1650–2200 Kg-m) |
| 15/16 inch (2.38 cm) | 975–1250 ft-lbs (1335–1710 Kg-m) |
| ⅞ inch (2.22 cm) | 700–1050 ft-lbs (960–1440 Kg-m) |
| 13/16 inch (2.06 cm) | 500–750 ft-lbs (680–1025 Kg-m) |
| ¾ inch (1.91 cm) | 320–525 ft-lbs (435–720 Kg-m) |
| 11/16 inch (1.75 cm) | 200–335 ft-lbs (275–460 Kg-m) |

Additional springs and differing materials could be employed to increase or change the stated ranges, and the examples are only given as preferred materials that were selected for ease of manufacture and availability. These springs are generally torsion spring and hence as linkage arm 18 is rotated about shaft 23, the moment of arm 12 is transmitted as tension through linkage arm 18 and extension element 30 of spring arm cap 17 and through coil end groove 32 to coil spring 22. This moment creates a torque which increases as arm 12 is lowered and cap 17 is caused to rotate in a clockwise manner as viewed from FIG. 3. The actual moment to linkage arm 18 is a function of the moment created by the spring balance system 10 and the geometry of the loading arm. The geometry is such that the support provided by the support spring to arm 12 is nearly equal and opposite to all positions for the full range of movement. In this embodiment, arm 12 can operate as shown by the cut out in housing 16 is therefore are arce of 120 degrees between a central point and plus minus 60 degrees to either side.

A variety of alternative applications could be readily provided from the basic design described herein and the invention could be applied to a variety of equipment and end uses, particularly where there is a need to support a pivoting or swiveling arm relative to a fixed position. The above described spring balance system 10 is therefore but one embodiment of the present invention and includes a protectively housed spring and the related linkage employed to support a pivoting arm relative to a fixed position. Various improvements, modification and alternative application and usage will be readily apparent to those of ordinary skill in the art. Accordingly, the scope of the present invention should be considered in terms of the following claims and it is not to be limited to the details of the embodiment and its structure and operation, shown in the specification and drawings.

We claim:

1. A loading arm comprising:
   (a) a support means;
   (b) an arm pivotally attached to said support means for swivel movement in the horizontal and vertical plane relative to said support means;
   (c) a means for balancing said swivel arm relative to said support means including:
      (1) a coil spring of pre-determined length;
      (2) a housing enclosing said coil spring;
      (3) a first end of said housing having a means for engaging a first coil end of said coil spring and a means for positioning said first coil end in infinitely small increments along a generally circular path radially disposed from the center line of said spring;
      (4) a second end of said housing having a means for engaging a second coil end of said spring;
      (5) a linkage arm attached at one end to said swivel arm and at its other end to said second end such that movement of said swivel arm in said vertical plane will cause said second coil end to move along a generally circular path radially disposed from the centerline of said spring; and
   (d) a means for attaching said balancing means to said loading arm and said horizontal swivel means.

2. The loading arm of claim 1 wherein said coil spring is a torsion spring.

3. The loading arm of claim 1 wherein means are provided to support said swivel arm in a rigid position relative to said spring balancing system to thereby relieve said coil spring of the swivel arm load.

4. The loading arm of claim 1 wherein said means for positioning said first coil end in infinitely small increments includes an adjusting screw, a barrel nut into which said adjusting screw threads, said barrel nut having a means for engaging said first coil end and being rotatably mounted in said housing and a stop to thereby limit the travel of said barrel nut.

5. In a loading arm having a support means, a swivel arm attached to said support means that is capable of swiveling in the horizontal and vertical planes relative to said support, and a spring balancing system, said spring balancing system comprising:

(a) a coil spring of pre-determined length having oppositely disposed coil ends;

(b) a housing, generally cylindrical in shape, for protectively enclosing said spring and having oppositely disposed end caps;

(c) a first end cap having a cut-out for receiving a first coil end, a barrel nut eccentrically positioned in said first end cap and having its threaded bore perpendicular to the center of said spring, and positioned along a chord of said end cap;

(d) an adjusting bolt for engaging said barrel nut and adapted to move said barrel nut and rotate said first end cap;

(e) a second end cap having a cut-out for receiving a second coil end, and an outwardly extending extension element;

(f) a linkage arm attached at one end to said swivel arm and at its other end to said second end cap such that movement of said swivel arm in said vertical plane will cause said coil end to move along a circular path, radially disposed from the center line of said housing.

6. The spring balance system of claim 5 wherein said coil spring is a torsion spring.

7. The spring balance system of claim 5 wherein said first end cap includes a stub shaft which has a groove for receiving said first coil end and wherein said second end cap includes a stub shaft having a groove for receiving said second coil end.

8. The spring balance system of claim 5 wherein means are provided to support said swivel arm in a rigid position relative to said spring balancing system to thereby relieve said coil spring of the swivel arm load.

9. The spring balance system of claim 5 wherein said adjusting bolt includes a stop to thereby limit the travel of said barrel nut.

* * * * *